US006695046B1

United States Patent
Byrnes et al.

(10) Patent No.: US 6,695,046 B1
(45) Date of Patent: Feb. 24, 2004

(54) VARIABLE SPEED FAN MOTOR CONTROL FOR FORCED AIR HEATING/COOLING SYSTEM

(75) Inventors: Howard P. Byrnes, Dallas, TX (US); Walter William Bowman, McKinney, TX (US)

(73) Assignee: Hoffman Controls Corp., Dallas, TX (US)

( * ) Notice: Subject to any disclaimer, the term of this patent is extended or adjusted under 35 U.S.C. 154(b) by 161 days.

(21) Appl. No.: 09/629,328

(22) Filed: Aug. 1, 2000

Related U.S. Application Data (63) Continuation-in-part of application No. 09/570,880, filed on May 15, 2000, which is a continuation of application No. 08/801,560, filed on Feb. 18, 1997, now Pat. No. 6,070,660.

(51) Int. Cl.[7] .............................. F25B 29/00; F23N 5/20
(52) U.S. Cl. ........................ 165/247; 165/244; 165/293; 236/11; 236/49.3; 236/DIG. 9; 236/78 D; 236/91 F; 237/8 R; 62/157; 62/180; 62/186; 62/231; 318/439; 318/471; 318/806; 126/110 A; 126/110 E
(58) Field of Search .................................. 165/293, 244, 165/247; 236/78 D, 49.3, 11, 91 F, 38, DIG. 9; 237/8 R; 126/110 A, 110 E; 62/157, 180, 186, 231; 318/439, 471, 806

(56) References Cited

U.S. PATENT DOCUMENTS

| | | | |
|---|---|---|---|
| 3,454,078 A | * | 7/1969 | Elwart ...................... 236/78 D |
| 3,489,345 A | | 1/1970 | Moreland |
| 3,674,203 A | * | 7/1972 | McGarth ...................... 236/38 |
| 3,912,162 A | | 10/1975 | Bauer et al. |
| 4,090,663 A | * | 5/1978 | Bonne et al. ............. 236/91 F |
| 4,369,916 A | | 1/1983 | Abbey |
| 4,421,268 A | * | 12/1983 | Bassett et al. ............ 236/91 F |
| 4,684,060 A | | 8/1987 | Adams et al. |
| 4,842,190 A | | 6/1989 | Orchard |
| 5,024,379 A | * | 6/1991 | Dempsey ................... 236/78 D |
| 5,248,083 A | * | 9/1993 | Adams et al. ................ 236/11 |
| 5,364,026 A | * | 11/1994 | Kundert ...................... 236/49.3 |
| 5,492,273 A | | 2/1996 | Shah |
| 5,582,233 A | | 12/1996 | Noto |
| 5,865,611 A | * | 2/1999 | Maiello ........................ 431/12 |
| 6,062,482 A | * | 5/2000 | Gauthier et al. ............. 236/11 |
| 6,070,660 A | | 6/2000 | Byrnes et al. |

FOREIGN PATENT DOCUMENTS

| | | | | |
|---|---|---|---|---|
| EP | 0419214 A | * | 3/1991 | ............... 236/91 F |
| GB | 1597220 | | 9/1981 | |

* cited by examiner

*Primary Examiner*—John K. Ford
(74) *Attorney, Agent, or Firm*—Gardere Wynne Sewell LLP (57) ABSTRACT

A fan motor speed control system for controlling the fan motor speed of an air conditioning system includes a power output circuit including a power triac which is turned on and off by an opto-isolator connected to a pulse generator circuit for varying an AC voltage waveform imposed on the fan motor. The pulse generator circuit is connected to heating and cooling ramp circuits and a minimum speed circuit to provide a variable voltage signal imposed on the pulse generator circuit corresponding to the temperature difference sensed by a return air sensor and a heating or cooling sensor or by separate heating and cooling sensors disposed adjacent respective heating and cooling heat exchangers of the air conditioning system. An adjustable minimum speed circuit and a cutoff circuit are provided to control motor minimum speed or motor shutoff when a predetermined minimum speed is reached to prevent motor bearing failure or overheating. Sensor protection circuits in the control system operate to drive the motor to full speed if any of the temperature sensors experience an open or short circuit condition. The control system circuit maximizes air conditioning system efficiency by capturing additional heating or cooling effect, reduces noise associated with motor startup and shutdown, and reduces rapid change in the sensed temperature in the air conditioned space during motor startup and shutdown.

16 Claims, 6 Drawing Sheets

FIG. 3C

VARIABLE SPEED FAN MOTOR CONTROL FOR FORCED AIR HEATING/COOLING SYSTEM

CROSS REFERENCE TO RELATED APPLICATION

This application is a continuation-in-part of U.S. patent application Ser. No. 09/570,880, filed May 15, 2000, which is a continuation of U.S. patent application Ser. No. 08/801,560, filed Feb. 18, 1997, now U.S. Pat. No. 6,070,660, issued on Jun. 6, 2000.

FIELD OF THE INVENTION

The present invention pertains to a control system for continuously varying the speed of a fan drive motor for a forced air indoor space heating/cooling system during startup and after shutdown of a heating/cooling cycle.

BACKGROUND OF THE INVENTION

Conventional controls for forced air heating and cooling systems often provide for delayed startup of the fan drive motor at a single operating speed and delayed shutdown of the drive motor from a single operating speed after shutdown of the heat exchangers of the heating/cooling system. Conventional controls are designed to minimize unpleasant cold or hot drafts of air and to capture residual heat/cooling effect. However, changing motor speed abruptly from a deenergized or shutoff state to full speed usually generates unpleasant noise, does not preclude stratification of air in the system ductwork or in the space being heated or cooled, nor does such operation maximize the capture of residual heat/cooling effect of the system heat exchange equipment.

Control systems have been developed for forced air heating/cooling systems wherein the indoor space air circulating fan drive motor is driven at reduced speed for a period of time during startup and at a reduced speed for a period of time during the run-on or shutdown phase of the heating/cooling system operating cycle. Again, this type of control system does not minimize the stratification of warm or cold air in the ductwork or the space being heated or cooled nor does such a system maximize the capture of residual heating/cooling effect.

Prior U.S. patent applications Ser. Nos. 09/570,880 and 08/801,560 (now U.S. Pat. No. 6,070,660) assigned to the assignee of the present invention and referenced hereinabove are directed to an improved fan or blower drive motor control system and method for forced air heating/cooling systems wherein the fan drive motor speed is continuously varied during a starting phase and a shutdown phase of operation of the heating/cooling system. In one embodiment of the control system disclosed in the aforementioned patent application and patent, the system senses temperature in the airflow circuit of the heating/cooling system and prevents premature or unwanted operation of the fan drive motor. The present invention is directed to improvements in control systems of that general type. The subject matter of U.S. Pat. No. 6,070,660 issued Jun. 6, 2000 to Howard P. Byrnes, et al. is incorporated herein by reference, in its entirety.

SUMMARY OF THE INVENTION

The present invention provides an improved fan or blower drive motor control system for a forced air heating/cooling system wherein a control circuit is provided which substantially continuously varies the speed of the fan drive motor during a starting phase and a shutdown phase of operation.

The control system may be easily adapted to conventional heating/cooling system controls to vary the forced air fan or blower drive motor speed in response to temperatures sensed in the heating/cooling system airflow circuit. The control system is particularly adapted for but not limited to use with permanent split capacitor or shaded pole blower or fan drive motors.

The control circuit includes an onboard power supply, an ac voltage wave crossover detector circuit and a control circuit for firing a triac to control the drive motor speed. The control system also includes a minimum speed detector circuit and a circuit which provides for continued operation of the fan drive motor at the minimum speed, if desired, or motor shutoff after reaching the minimum speed.

The control system of the present invention includes one embodiment which comprises a temperature sensor disposed in an airflow ductwork on the so-called return air side of the heating and/or cooling equipment and a temperature sensor on the downstream or so-called supply air side of the heating and/or cooling equipment.

In another embodiment, three sensors are disposed in the ductwork including the return air sensor which is disposed upstream with regard to the direction of airflow from an air heater heat exchanger, a heat sensing sensor which is disposed downstream of the air heater heat exchanger and a third sensor which is disposed downstream of an air cooling heat exchanger, such as an evaporator coil, for example. In this way a more versatile control system is provided and more accurate sensing of temperature is obtained, depending on the operating condition of the system, heating versus cooling.

The control systems of the present invention advantageously reduce energy consumption of conventional forced air heating and cooling systems, improve recovery of residual heating/cooling effect in conventional forced air heating/cooling systems, minimize stratification of air in the airflow circuit and the space being heated or cooled and reduce cold or hot air drafts during operation of the heating/cooling system. Moreover, by substantially continuously varying the fan or blower drive motor speed during startup and shutdown, noise associated with fan or blower operation is reduced and the circulation of air at a temperature other than normally sensed or preferred by occupants of an indoor space being heated or cooled is also reduced.

Those skilled in the art will further appreciate the important features and advantages of the invention, together with other superior aspects thereof upon reading the detailed description which follows in conjunction with the drawing.

DETAILED DESCRIPTION OF PREFERRED EMBODIMENTS

In the description which follows like elements are marked throughout the specification and drawing with the same reference numerals, respectively. Conventional elements are shown in somewhat generalized or schematic form in the interest of clarity and conciseness.

Figure 1:
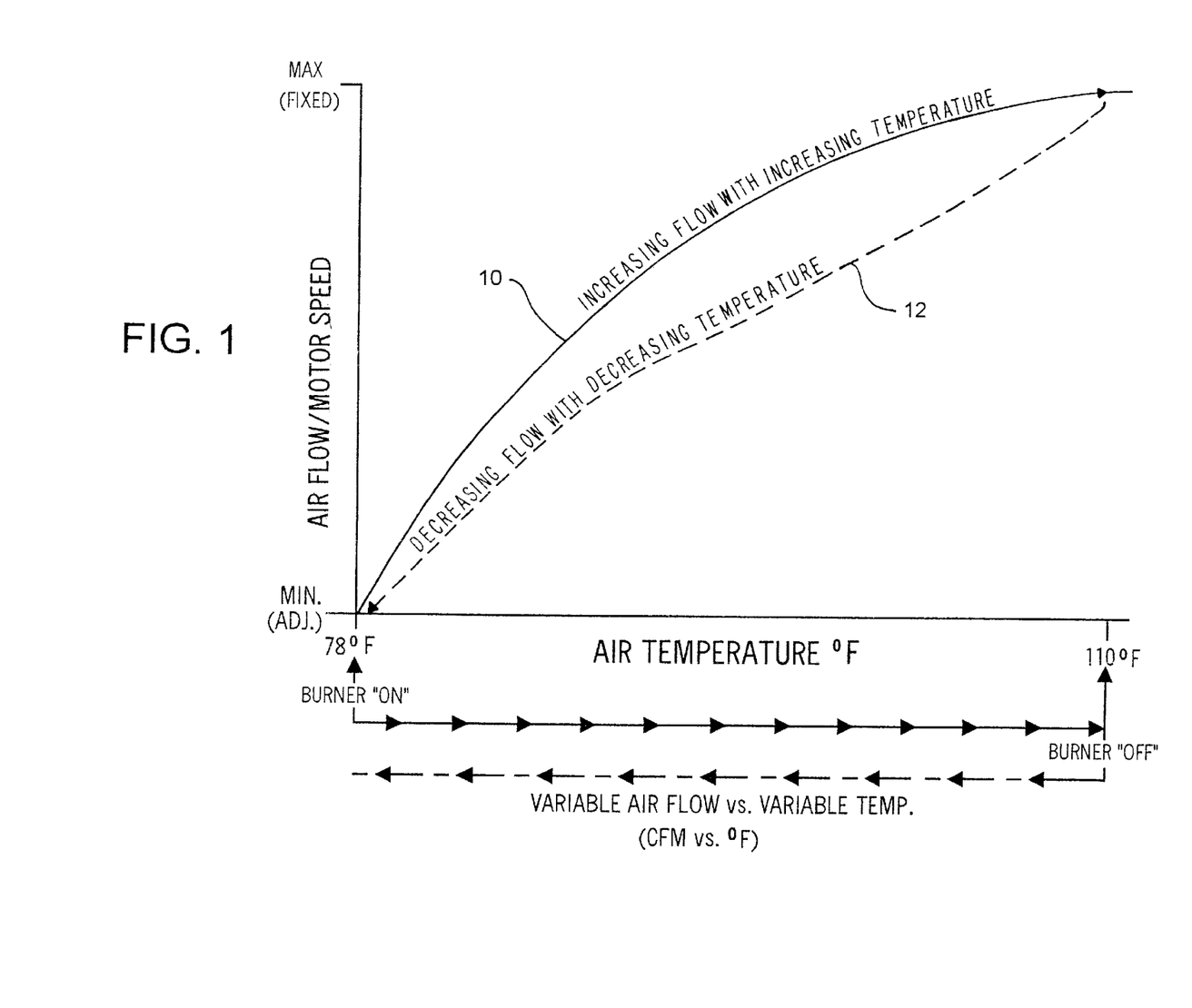
FIG. 1 is a diagram of air temperature versus flow and motor speed indicating the change in airflow with increasing temperature sensed in the airflow circuit as well as decreasing flow with decreasing temperature in the airflow circuit in accordance with the control system of the present invention.

Referring to FIG. 1, the diagram illustrates a preferred change in motor speed and airflow rate through a conventional forced air heating/cooling system when the system thermostat senses the need for heating, for example, at a temperature setpoint of 78° F. in the space being heated. When the temperature sensed by the conventional system temperature sensor or thermostat drops below the setpoint of 78° F., for example, the furnace or heater turns on and the control system of the invention energizes the blower or fan drive motor at a minimum speed. When the air temperature sensed in the system ductwork increases, primarily at a location just downstream of the heater heat exchanger, as compared with the temperature in the return air duct upstream of the heater heat exchanger, the motor speed is increased.

Motor speed is proportional to airflow increase, and generally follows curve 10 in FIG. 1 until the temperature sensed by the sensor which is downstream of the heater heat exchanger reaches a setpoint of 110° F. At this time the blower motor continues to operate at full speed until the thermostat in the space being heated indicates that the demand for heating has been satisfied and the heater or "burner" is turned off so that the heater heat exchanger begins to cool. Accordingly, as the temperature sensed by the sensor which is disposed downstream in the direction of flow of air through the system decreases in relation to the return air temperature sensed at a point upstream of the heat exchanger, the control system of the invention varies the fan speed by continuously decreasing the fan drive motor speed. Airflow provided by the motor driven fan decreases along curve 12 in FIG. 1 until a minimum speed of the motor is reached which may result in continuous operation at the minimum speed or, at a slightly lower temperature, motor shutoff occurs.

Accordingly, motor operation and the airflow characteristic, as a function of the sensed temperature, provides for delivery of residual heat from the heater heat exchanger to the space being heated with increased efficiency, airflow increases and decreases gradually on start and stop of the heater or burner for quiet operation of the system and stratified air layers at various temperatures are substantially eliminated in the heating/cooling system ductwork and in the space being heated or cooled. More efficient operation of the heating/cooling system is obtained and a greater comfort level is provided for persons occupying the space controlled by a system in accordance with the invention.

Figure 2:
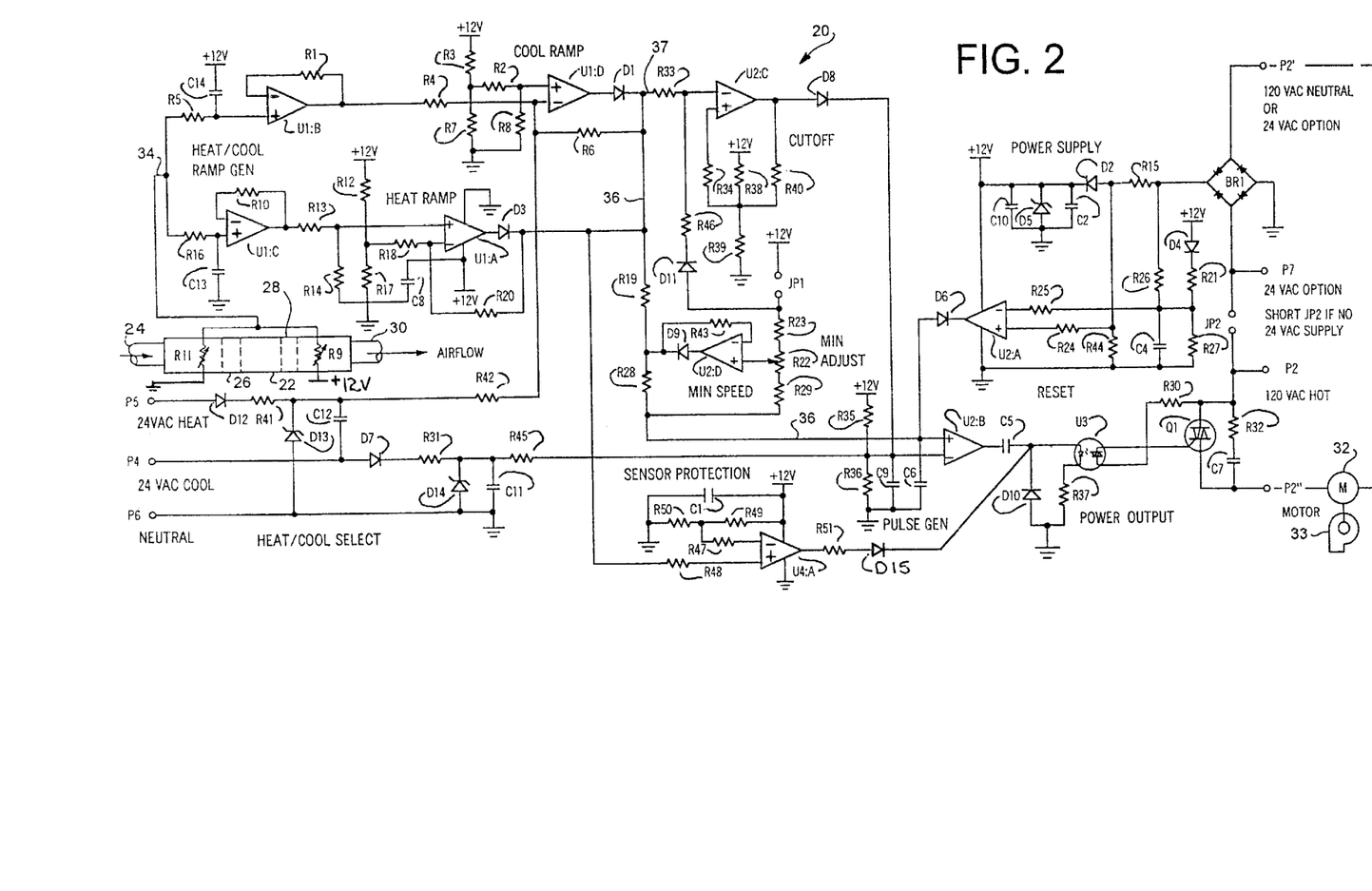
FIG. 2 is a schematic diagram of one preferred embodiment of a control system in accordance with the invention.

Referring now to FIG. 2, there is illustrated a schematic diagram of one preferred embodiment of a temperature sensing, variable speed fan or blower motor control system in accordance with the invention and generally designated by the numeral 20. The control system 20 is operable to sense the temperature in a ductwork of a conventional forced air heating and cooling system, a section of which ductwork is illustrated in FIG. 2 and generally designated by the numeral 22. Ductwork 22 includes a return air duct part 24 whereby airflow from a space being heated or cooled is being returned for heating by a heater heat exchanger 26 or cooled by a cooling heat exchanger 28. Accordingly, a return air temperature sensor R11 is disposed in the ductwork 22 upstream of the heat exchanger for the heater 26 and a so-called supply air sensor R9 is disposed in ductwork 22 downstream, with respect to the direction of airflow, of the air cooling heat exchanger 28 whereby supply air treated by the heating/cooling system is then returned to the control space via a supply air duct 30. In fact, the ductwork 22 may comprise a conventional forced air furnace/air conditioning system wherein the heat exchanger 26 includes a gas fired burner or electrical resistance heater, not shown, and the heat exchanger 28 is an evaporator coil of a conventional vapor compression refrigeration circuit, not shown. The illustration of FIG. 2 with respect to the heating/cooling system is exemplary.

Referring further to FIG. 2, a HEAT/COOL SELECT circuit is indicated whereby, for example, when a heater associated with heat exchanger 26 is energized, such as by opening a gas burner valve, for example, 24 volt AC electrical power is applied across terminals P5 and P6. Alternatively, when an air cooling system is operable, such as a vapor compression refrigeration system, and the compressor thereof is energized, 24 volt AC power is applied across terminals P4 and P6. Power for the control system 20 is supplied by a 120 volt AC source at terminal P2 and a neutral conductor P2'. Alternatively, 24 volt AC power may be applied at terminals P7 and P2'. A fan or blower drive motor 32 may be connected at terminals P2' and P2" as indicated in FIG. 2. The motor 32 may be of a type described in U.S. Pat. No. 6,070,660 which is incorporated herein by reference. The control system 20 is preferably connected to the motor medium speed winding as in the system of the '660 patent.

As further shown in FIG. 2, a 12 volt DC power supply circuit is made up of capacitors C2 and C10, resistor R15, a diode D2 and a Zener diode D5. A four diode bridge BR1 takes either the 24 volt AC signal from a step down transformer, not shown, or the 120 volt AC source at terminals P2 and P2'. A RESET circuit comprising resistors R21, R24, R25, R26, R27, R44, diodes D4 and D6, capacitor C4 and amplifier U2:A is operable to receive full wave voltage from the diode bridge BR1 through resistors R25, R26, diode D6 and amplifier U2:A to capacitor C6 for the purpose of discharging capacitor C6 every half cycle. Thus an output pulse always starts at the proper moment on each half cycle. If 24 volt AC power is input to the power supply and RESET circuits, jumper JP2 is open and is shorted if there is no 24 volt AC supply.

Sensors R9 and R11 are preferably thermistors which are substantially similar and interposed in a HEAT/COOL RAMP GEN circuit to generate signals as the temperature differences change between each sensor location. If both sensors are at the same temperature the output of the sensors will be one-half of the 12 volt DC supply voltage. If the downstream or so called supply air sensor R9 senses a temperature greater than the return air sensor R11, the output voltage at conductor 34 increases. If the temperature sensed by sensor R9 is less than that sensed by sensor R11, voltage at conductor 34 will decrease. The output signal from the sensors R9 and R11 is input to the ramp circuits indicated in FIG. 2 as the COOL RAMP and the HEAT RAMP. If the output signal voltage is increasing the HEAT RAMP circuit is activated which comprises resistors R10, R12, R13, R14, R16, R17, R18 and R20, capacitors C8 and C13, diode D3, buffer amplifier U1:C and amplifier U1:A arranged in circuit as shown in FIG. 2. The output signal of the HEAT RAMP circuit is imposed on conductor 36.

The COOL RAMP circuit is also connected to conductor 34 to receive the resultant output signal from sensors R9 and R11 and if the signal magnitude is decreasing, a voltage output at conductor 36, 37 is increasing. The ramp output voltage generated by the COOL RAMP circuit is provided by circuit components including resistors R1, R2, R3, R4, R5, R6, R7, R8, capacitor C14, diode D1 and amplifiers U1:B and U1:D. Capacitors C13 and C14 slow the change in the output signal of amplifier U1:B or U1:C which will minimize the chance of lockup of motor 32. Capacitors C13 and C14 also minimize unwanted electrical noise from entering the ramp circuits previously described.

The control system 20 further includes a pulse generator or PULSE GEN circuit including resistors R35, R36, R37, capacitors C5, C6 and C9, opto-isolator U3 and diode D10. Ramp output voltage is input through resistors R19 and R28 to the PULSE GEN circuit and operational amplifier U2:B which has a reference voltage set at its negative input. When the ramp voltage exceeds this reference voltage, the output of amplifier U2:B goes "high". Capacitor C6 connects to the ramp voltage signal on conductor 36 also. Accordingly, a sawtooth waveform is input at the positive (+) terminal of amplifier U2:B. Therefore, the output of the PULSE GEN circuit is a square wave whose width varies as the ramp voltage signal varies. Since the RESET circuit discharges capacitor C6 every half cycle, the output pulse of the PULSE GEN circuit always starts at the correct time on each half cycle.

A POWER OUTPUT circuit is shown in FIG. 2 comprising resistors R30, R32, power triac Q1 and capacitor C7. A square wave output signal from the PULSE GEN circuit is imposed on capacitor C5 which causes a voltage pulse to turn on the input diode of opto-isolator U3 and when the diode in opto-isolator U3 conducts its output triac turns "on". This action causes current to flow into the gate of the power triac Q1 which is connected to motor 32. When current flows through the power triac Q1, motor 32 is energized to rotate to drive fan or blower 33 which is operably associated with the ductwork 22. A snubber comprising resistor R32 and capacitor C7 are connected to power triac Q1 to protect triac Q1 from unexpected line voltage surges.

Referring still further to FIG. 2, a CUTOFF circuit includes resistors R33, R34, R38, R39 and R40, diode D8 and amplifier U2:C. Amplifier U2:C is operable to receive a variable voltage signal at its negative terminal via conductor 37 and, when the ramp voltage drops to a predetermined value, amplifier U2:C goes "high" and provides a signal coupled through diode D8 to the PULSE GEN circuit. When a "high" signal is imposed on the negative (−) terminal of amplifier U2:B, the output signal of U2:B goes "low" shutting off an output signal from power triac Q1 and motor 32 stops. Accordingly, when the ramp voltage at conductors 36, 37 increases slightly above a dropout value, the CUTOFF circuit output at amplifier U2:C goes low. This allows the ramp voltage to resume normal output to control the motor 32 through the triac Q1.

The CUTOFF circuit, including amplifier U2:C, is operably connected to a jumper JP1 in a MIN SPEED circuit as shown in FIG. 2. The discussion hereinabove regarding the CUTOFF circuit assumes that the jumper JP1 is open. When jumper JP1 is closed, control system supply voltage is coupled through diode D11 to the negative input terminal of amplifier U2:C. The output signal of amplifier U2:C is then forced "low" regardless of the ramp voltage input to amplifier U2:C and therefore the pulse generator is not shutoff due to the CUTOFF circuit. The MIN SPEED circuit of the control system 20 includes resistors R19, R22, R23, R28, R46, diodes D9 and D11 and amplifier U2:D. When the jumper JP1 is open, the output of the MIN SPEED circuit is low at the output of amplifier U2:D and the adjustable resistor R22, which is operable to adjust the minimum speed of the motor 32, is inoperable. When JP1 is closed, the CUTOFF circuit previously described is disabled through diodes D11 and resistor R46 and the MIN SPEED circuit is enabled. Adjustment of the minimum speed resistor or potentiometer R22 enables the motor 32 to be set to run from approximately 180 rpm to 620 rpm, for example. The motor minimum speed will hold even though there may be a zero difference between supply air and return air temperatures as sensed by the sensors R9 and R11.

The aforementioned HEAT/COOL SELECT circuit includes a cooling condition input circuit including resistors R31 and R45, diodes D7 and D14 and capacitor C11. A 24 volt AC signal on the aforedescribed circuit will deactivate motor 32 by deactivation of triac Q1. This signal overrides any signals produced by the sensors R9 and R11. Consequently, when the control system 20 is connected to the medium speed winding of a motor, such as the motor 32, and the conventional control system for the motor applies power to the high speed winding and the 24 VAC COOL signal is provided at terminals P4 and P6 only the desired motor winding will be energized. However, when the thermostat is satisfied in the space being cooled and a signal is removed from terminals P4 and P6 the control system 20 will be operable to energize the motor 32 at the medium speed winding and gradually reduce the motor speed as the temperature difference between the sensors R9 and R11 decreases.

Conversely, when a 24V AC HEAT input signal is provided at the HEAT/COOL SELECT circuit, the COOL RAMP circuit is disabled and only the temperature of sensor R9 rising above the temperature of sensor R11 will affect motor speed. The sensor R9 temperature, when below the sensor R11 temperature, will maintain the HEAT/COOL RAMP GEN circuit at its minimum voltage. Motor 32 will either then be at zero speed or a minimum speed depending on the selection of the connection of jumper JP1 for cutoff or minimum speed. The heat input side of the HEAT/COOL SELECT circuit includes capacitor C12, diodes D12, D13 and resistors R41 and R42.

Lastly, the control system 20 includes a SENSOR PROTECTION circuit including resistors R47, R48, R49, R50, R51, capacitors C1, diode D15 and amplifier U4:A. A positive input signal to amplifier U4:A of the SENSOR PROTECTION circuit is provided by the ramp output voltage signal and the protection circuit negative input to amplifier U4:A is connected to a reference voltage available from resistors R49 and R50. When the ramp output voltage exceeds the reference voltage, the output signal of amplifier U4:A goes high and this DC voltage signal is connected to the opto-isolator U3 through diode D15. This action causes the triac Q1 to be on full at all times and avoid the possibility of motor lockup.

Still further, there are three ways for the ramp output voltage signal to exceed the reference voltage signal at amplifier U4:A, which reference is established by resistors R49 and R50, namely (1) if either of the sensors R9 or R11 are open, (2) if both of sensors R9 and R11 are open or are shorted, or (3) if the design parameter for the temperature difference between sensors R9 and R11 has been exceeded. If any of the above noted conditions occurs the motor 32 will be fully on until the condition goes back to the system normal mode of operation or power is removed from the control system 20.

Figure 3:
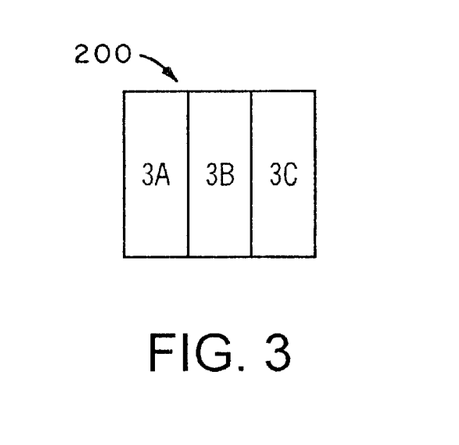
FIG. 3 is a schematic diagram of another preferred embodiment of the invention and comprises FIGS. 3A, 3B and 3C, which may be viewed when arranged in accordance with the map diagram of FIG. 3.

An alternate embodiment of a control system in accordance with the invention will now be described in conjunction with FIGS. 3 and 4. In certain air conditioning systems it may be necessary to monitor a change in cooling air temperature and heating air temperature at different locations in the air conditioning system and the reference or return air sensor may be required to be mounted in a return air duct to monitor temperature in a third location. A major advantage of having the flexibility of being able to choose the location of the temperature sensors is with regard to certain installations wherein, for example, during a cooling phase of operation air is routed through a different duct than for the routing of air during heating operation. Still further, in other applications the heating/cooling equipment may be arranged such that the location of the so-called supply air sensor may be suitable for the heating mode of operation but not the cooling mode or vice versa.

Figure 4:
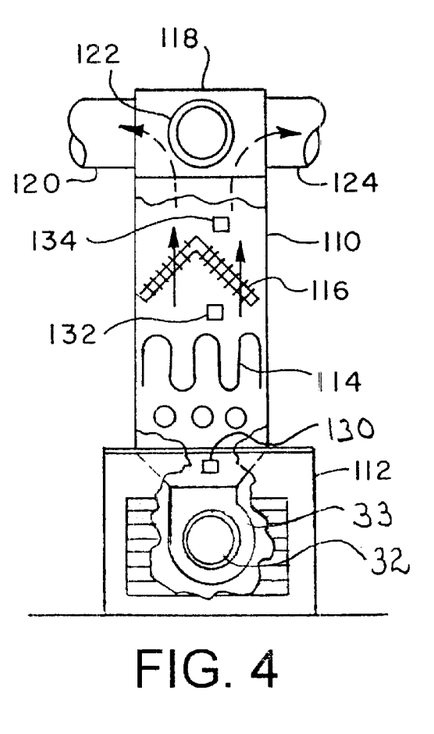
FIG. 4 is a somewhat schematic illustration of an air conditioning system showing one preferred arrangement of the locations of the sensors for the control system of FIG. 3.

By way of example, and referring to FIG. 4, there is illustrated a vertical or updraft air conditioning system 110 which includes duct or cabinet 111. Cabinet 111 is mounted on a return air plenum 112 whereby air being returned from an air conditioned space enters the system 110 and flows upward over surfaces of a heat exchanger 114 and then further upward through an evaporator coil or air cooling heat exchanger 116 before being discharged into a supply air plenum 118 for distribution through suitable supply air ducts 120, 122 and 124, for example. The motor and blower or fan 32, 33 for the system 110 is shown in one preferred location in plenum 112 in the somewhat schematic illustration of FIG. 4, but may also be located, alternatively, in the cabinet 111, for example.

Figure 3A:
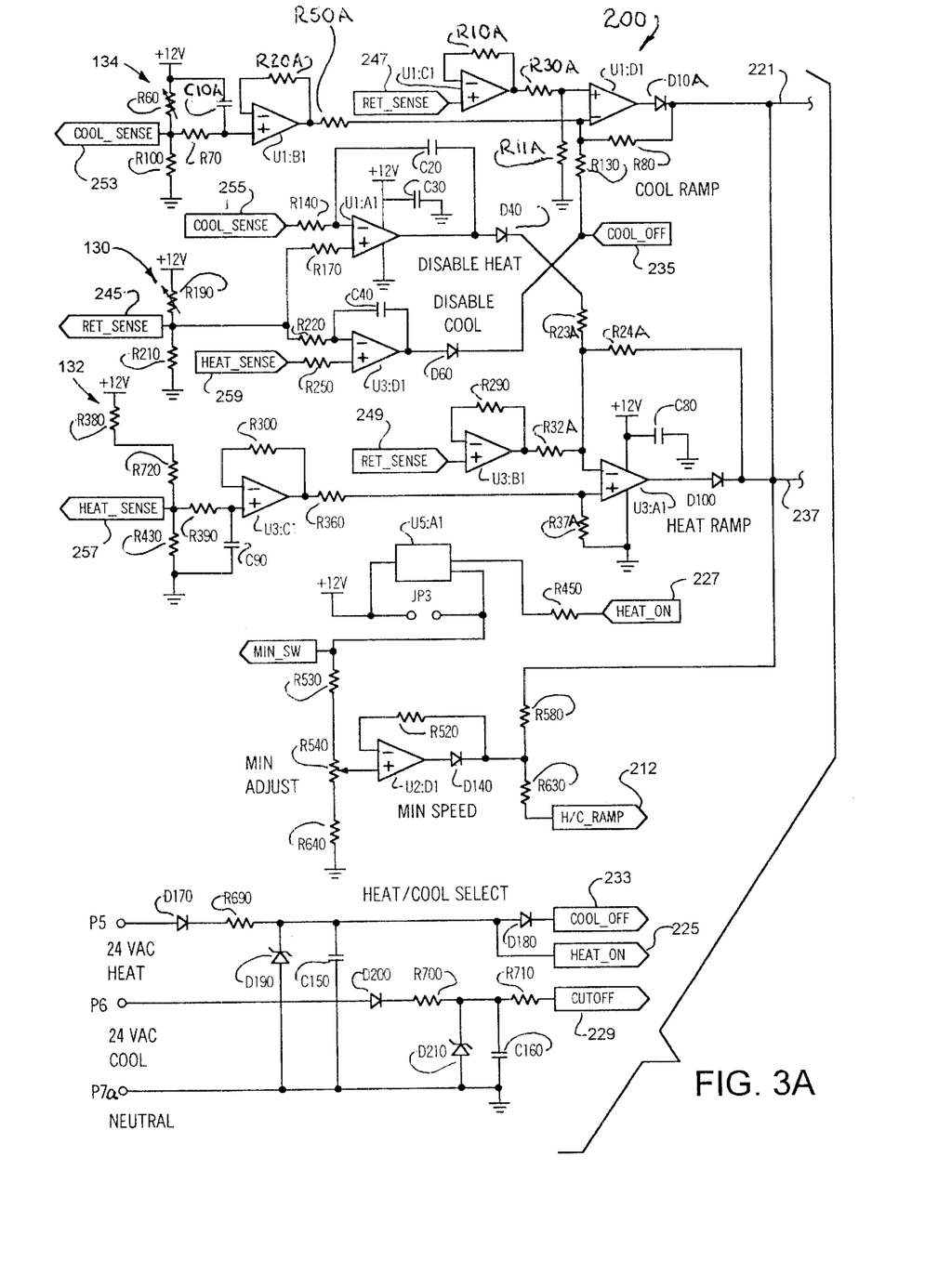
Figure 3B:
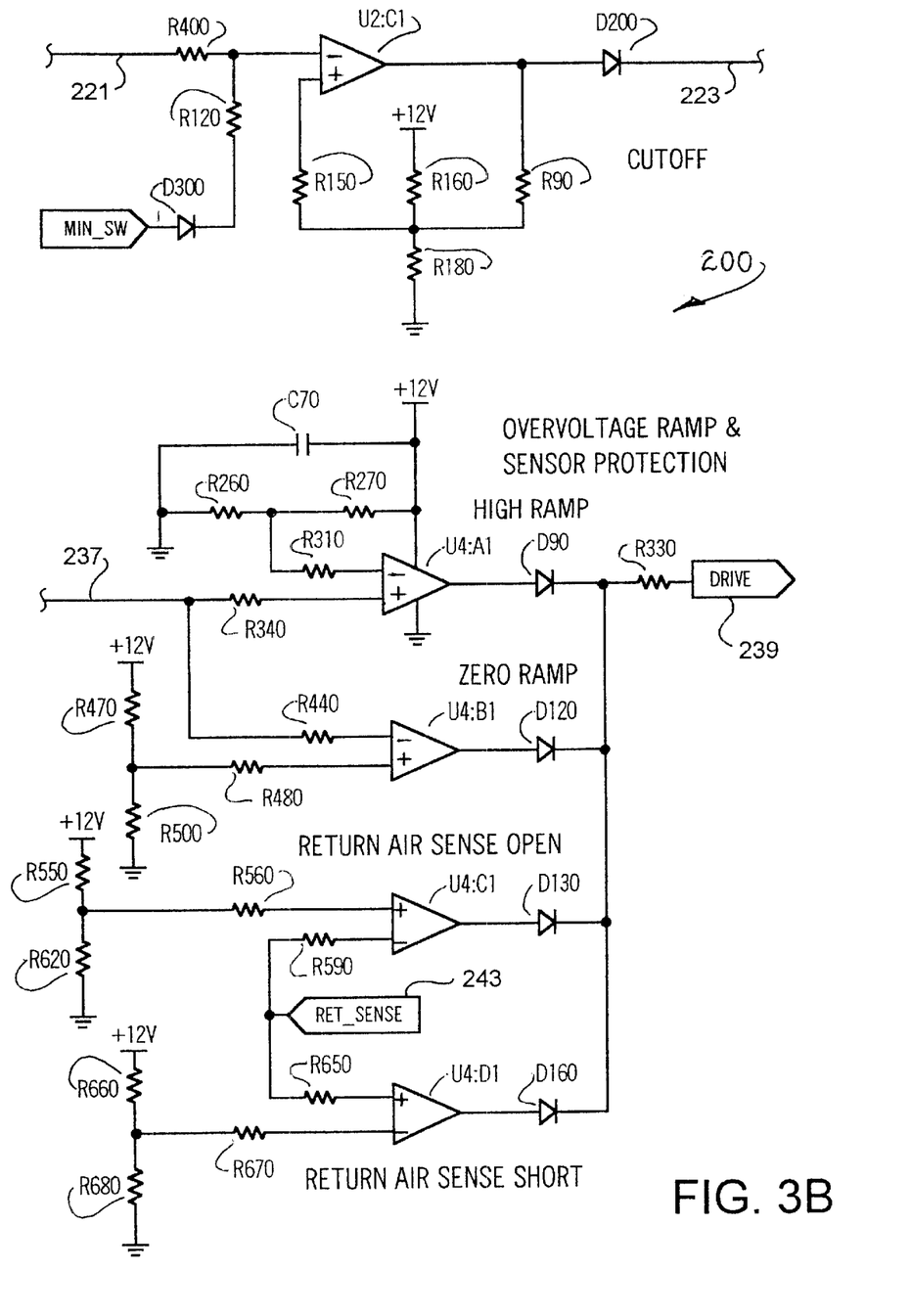
Figure 3C:
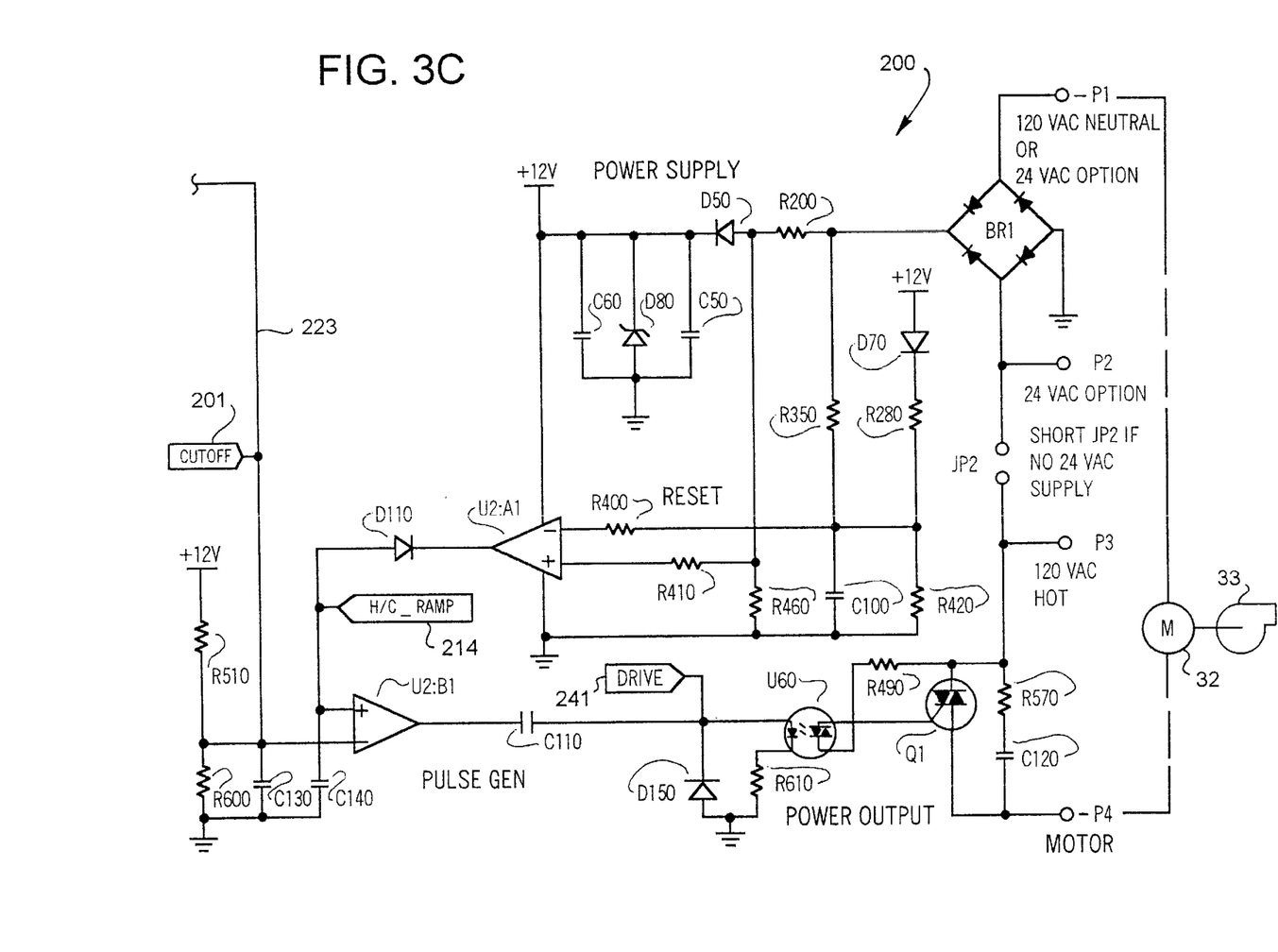

A control system 200 is illustrated in FIGS. 3A, 3B and 3C which is advantageous for use with the air conditioning system 110 of FIG. 4. The system 110 of FIG. 4 is provided to illustrate that a typical location of a return air sensor 130 would be in the return air duct or plenum 112. A heated air sensor 132 should be disposed just downstream in the direction of airflow through the system 110 of the heat exchanger 114 for sensing the temperature of heated air, and a third or cooling air sensor 134 is shown located just downstream, in the direction of airflow, from the evaporator or cooling coil 116. With this arrangement more accurate and timely readings of the heated air temperature and the cooled air temperature is provided even though the flowpath for the air during the heating mode or the cooling mode is not through separate ducts in the exemplary system 110.

Referring now to FIG. 3C, the control system 200 includes a POWER SUPPLY circuit substantially like the power supply for the control system 20. Power at 120 volts AC may be applied at terminals Pi and P3 or alternatively 24 volt AC power may be applied at terminals P1 and P2. As indicated in FIG. 3C, a jumper JP2 is applied if 120 volt AC power is connected to the control system. Motor 32 is connected between terminals P1 and P4 also, as indicated. The POWER SUPPLY circuit is made up of capacitors C60 and C50, resistor R200, diodes D50 and D80 and bridge circuit BR1. Bridge circuit BR1 is a set of four diodes which cause a fullwave bridge output signal to be developed. Since the voltage developed falls to near zero every half cycle, the output is used to synchronize a pulse generator by resetting capacitor C140 every half cycle. A RESET circuit including diode D70, resistors R280, R420, R350, capacitor C100, resistor R460, resistor R410, resistor R400, amplifier U2:A1 and diode D110 provides an output pulse to amplifier U2:B1 at the correct moment on each cycle.

Control system 200 also includes a PULSE GEN circuit, as shown in FIG. 3C, comprising resistors R510, R600 and R610, diode D150, amplifier U2:B1, and capacitors C130, C140 and C110. A voltage signal from the ramp circuits shown in FIG. 3A and to be described further herein is provided via reference terminal 212 in FIG. 3A to reference terminal 214 in FIG. 3C. This voltage is applied to the positive terminal of amplifier U2:B1 and a reference voltage provided through resistors R510 and R600 is applied to the negative terminal of amplifier U2:B1. When the ramp voltage at reference terminal 214 exceeds the reference voltage, amplifier U2:B1 provides a "high" output signal. Capacitor C140 connects to the ramp voltage signal imposed on reference terminal 214 and a sawtooth waveform results at the positive terminal of U2:B1. Accordingly, the output signal of amplifier U2:B1 is a square wave whose width varies as the ramp voltage imposed on reference terminal 214 varies.

A POWER OUTPUT circuit of the control system 200 includes resistors R490, R570, amplifier or opto-isolator U60 and power triac Q1 as well as capacitor C120. The aforementioned squarewave output signal from the amplifier U2:B1 is connected to capacitor C110. A voltage pulse is formed by capacitor C110 and diode D150 to the input diode of opto-isolator U60. When the aforementioned input diode of opto-isolator U60 conducts, an output triac of the opto-isolator U60 turns "on" which causes current to flow into the gate of power triac Q1. Motor 32 is connected to the power triac Q1 at terminal P4 and when current flows through the triac, the motor is energized to drive fan or blower 33. A snubber resistor-capacitor combination comprising resistor R570 and capacitor C120 are connected to the power triac Q1 to protect the triac from unexpected line voltage surges.

Referring now to FIG. 3B also, a fan motor speed CUTOFF circuit is shown including resistors R400, R150, R160, R180, R90, R120, diode D300, diode D200 and amplifier U2:C1. The negative terminal of amplifier U2:C1 is connected to a HEAT/COOL RAMP circuit shown in FIG. 3A through resistor R400 via conductor 221. When the COOL RAMP circuit output voltage drops to a predetermined level, as determined by the reference voltage at the positive terminal of amplifier U2:C1, this amplifier provides an output signal to diode D200 and the PULSE GEN circuit by way of conductor 223 which is coupled to the negative input terminal of amplifier U2:B1. When a "high" output signal is applied via conductor 223 to amplifier U2:B1, the output signal of amplifier U2:B1 goes "low" shutting down the output signal of opto-isolator U60 and power triac Q1 thereby deenergizing motor 32. When the HEAT/COOL RAMP voltage signal from conductor 221 increases slightly above a so-called dropout voltage, the output signal from amplifier U2:C1 goes low and allows the ramp voltage signal to resume normal action to control the motor speed through the power triac Q1. It should be noted that the CUTOFF circuit just described has a hysteresis equivalent to approximately 10 rpm on motor 32.

The above description with respect to the CUTOFF circuit assumes that the jumper JP3, FIG. 3A, is in an open condition. When jumper JP3 is closed, the supply voltage provided thereby enables a reference voltage to the noninverting input of amplifier U2:D1, the output voltage of which is coupled through diode D140 to the output conductors of the HEAT/COOL RAMP and HEAT RAMP circuits and the reference terminals 212, 214, which determines the motor speed by biasing amplifier U2:B1 as previously described. By adjusting an adjustable resistor R540 of a MIN SPEED circuit, FIG. 3A, the minimum speed of the motor 32 can be preset.

However, when jumper JP3 is open, switch U5:A1 is connected across the JP3 contacts. Switch U5:A1 is energized through resistor R450 which connects to a 24 volt AC HEAT signal of the HEAT/COOL SELECT circuit, FIG. 3A, by way of reference terminals 225 and 227 and by way of diode D170, resistor R690, diode D190, capacitor C150 and resistor R450. With this arrangement, when a 24 volt AC HEAT signal is present, the MIN SPEED circuit is energized and if the MIN SPEED circuit is energized, the CUTOFF circuit, FIG. 3B, is deenergized by way of resistors R580 and R400. Accordingly, when a signal is applied to the 24 volt AC HEAT input, switch U5:A1 is immediately switched on and this action shorts jumper JP3 from resistor R530 to positive 12 volts DC. A bias voltage is applied to positive pin of amplifier U2:D1 and the output of amplifier U2:D1 is applied at the reference terminal 212 through diode D140. Therefore, as the control system 200 is operated in conjunction with the air conditioning system 110, wherein a signal indicating a heat mode of operation is applied, the motor 32 runs at a minimum speed to provide better air circulation surrounding sensors 130, 132 and 134.

Adjustment of the minimum speed MIN ADJUST resistor R540 enables the motor speed to be set from approximately 180 rpm to 620 rpm. The minimum speed of the motor 32 will hold at its designated RPM even though there may be no difference between supply air and return air temperatures.

Referring further to FIG. 3A, the HEAT/COOL SELECT circuit is operable to provide a 24 volt AC input signal at 24 VAC COOL across terminals P6 and P7a and imposed on diode D200, resistors R700, R710, diode D210 and capacitor C160. When 24 volt AC power is applied across terminals P6 and P7a, motor 32 is turned off by deactivation of power triac Q1 due to the application of an output signal at reference terminal 229 which is connected to reference terminal 231, FIG. 3C. In other words, when a voltage is applied to reference terminals 229, 231 and the negative terminal of amplifier U2:B1 the output signal of amplifier U2:B1 goes "low" and causes opto-isolator U60 and power triac Q1 to shut off power to motor 32. A signal as described above applied at reference terminal 229 overrides signals provided by return air sensor 130 and supply air sensors 132 and 134. Accordingly, the control system 200 is also operable to avoid supplying power to both the high speed winding and the medium speed winding of the motor 32 when the thermostat for the air conditioning system 110 has called for operation in the cooling mode and the motor is being separately controlled by the conventional motor control system to operate at a high speed. However, as with the control system 200 when a control signal is removed across terminals P6 and P7a, the control system 200 will assume control over the motor 32 and will gradually decrease the speed of the motor as determined by the difference in temperatures sensed by the sensors 130 and 134.

Referring further to FIG. 3A, when a 24 volt AC signal is applied across terminals P5 and P7a and diode D170, resistor R690, diode D190, capacitor C150 and diode D180, the COOL RAMP circuit is disabled by way of reference terminal 233 which is connected to reference terminal 235 in FIG. 3A. Under these operating conditions only temperatures rising above the sensor 132 temperature compared to the return air sensor 130 will affect motor speed. Temperatures sensed by the heat sensor 132 and cool air sensor 134, if less than the temperature sensed by the return air sensor 130, will only maintain a HEAT RAMP circuit output voltage at its minimum. This will cause the motor 32 to operate at zero rpm or at its minimum speed, depending on whether a cutoff or minimum speed mode is chosen.

Referring now to FIG. 3B, an OVERVOLTAGE RAMP AND SENSOR PROTECTION circuit is provided which includes capacitor C70, resistors R260, R270, R310 and R340, amplifier U4:A1, diode D90 and resistor R330 for the HIGH RAMP output. The OVERVOLTAGE RAMP AND SENSOR PROTECTION circuit further includes resistors R470, R500, R440, R480, amplifier U4:B1 and diode D120, for the ZERO RAMP. Resistors R550, R620, R560, R590, amplifier U4:C1 and diode D130 comprise the circuit of a RETURN AIR SENSE OPEN output. Resistors R660, R680, R650, R670, amplifier U4:D1 and diode D160 comprise the circuit for the RETURN AIR SENSOR SHORT output. The purpose of these circuits is to cause the motor 32 to be driven at full speed if either of the sensors 130, 132 or 134 is in an open or a shorted operating condition, or if the HEAT/COOL RAMP is at zero or greater than the ramp voltage boundaries.

Referring further to FIG. 3B, amplifier U4:A1 receives an input signal on its positive terminal by way of conductor 237 which is connected to the HEAT/COOL RAMP of FIG. 3A. An output signal from amplifier U4:A1 goes high when the COOL RAMP or HEAT RAMP circuit output signals equal or exceed a differential temperature trip point. In fact, amplifiers U4:A1, U4:B1, U4:C1 and U4:D1 are all operable, when providing a high output signal, to cause motor 32 to run at full speed. The output signals from any one of these amplifiers is conducted via reference terminals 239 and 241 to the opto-isolator U60.

Referring further to FIG. 3B, an output signal from amplifier U4:B1 goes high when the output from the HEAT RAMP or COOL RAMP circuits goes to zero. This occurrence would be the result of the cool sensor 134 being shorted or the heat sensor 132 going to an open condition. The output signal from amplifier U4:A1 goes high when the output signal from the HEAT RAMP circuit or the COOL RAMP circuit goes high. This occurs when the cool sensor 134 has an open circuit condition or when the heat sensor 132 experiences a shorted condition. Still further, the output signal from amplifier U4:C1 goes high when the return air sensor 130 is in an open condition and the output signal from amplifier U4:D1 goes high when the return air sensor is shorted. A signal from the return air sensor 130 is supplied to amplifiers U4:C1 and U4:D1 via reference terminals 243 and 245. Reference terminals 247 and 249, FIG. 3A, are also connected to reference terminal 245 and impose signals on amplifiers U1:C1 and U3:B1.

Referring further to FIG. 3A, the HEAT RAMP circuit receives a variable voltage signal from the heat sensor 132 by way of a buffer amplifier U3:C1. The output of the HEAT SENSE circuit, the junction of resistors R720 and R430, is connected to the HEAT RAMP circuit through resistor R390 and buffer amplifier U3:C1. Amplifier U3:A1 is a differential amplifier and its output voltage is determined by the difference between the heat sensor voltage output signal and the return air sensor voltage output signal which is the output signal from the junction of resistors R190 and R210 as imposed on reference terminal 249. Amplifier U3:B1 is also a buffer amplifier for the return air sensor voltage output signal. A variable voltage output signal from amplifier U3:A1 and diode D100 is thus imposed on reference terminals 212 and 214 through resistors R580 and R630.

Referring still further to FIG. 3A, the COOL RAMP circuit includes resistors R20A, R30A, R50A, R70, R80, R10A, R11A, capacitors C10A and amplifiers U1:B1, U1:C1 and U1:D1 as well as diode D10A. Capacitors C10A and C90 minimize the effect of a step function at the output of the cool sensor 134 or heat sensor 132 to prevent motor lockup and also to minimize unwanted electrical noise from entering the circuit. The output signal from the cool sensor 134 is connected to the COOL RAMP circuit through resistor R70 to buffer amplifier U1:B1 whose output is imposed on amplifier U1:D1. Amplifier U1:D1 is a difference amplifier whose output signal is determined by the difference between the cool sensor voltage output signal and the return air sensor voltage signal at the junction of resistors R190 and R210. Amplifier U1:C1 is a buffer amplifier for the output signal of return air sensor 130. The output signal from the COOL RAMP circuit is by way of amplifier U1:D1 through diode D10A to conductor 221 and to reference terminal 212 by way resistors R580 and R630. The output signal from the junction of resistors R60 and R100 is also imposed on amplifier U1:A1 by way of reference terminals 253 and 255 to disable the HEAT RAMP circuit when the system 200 is operating in a cooling mode. Conversely, the output of the heat sensor 132, as measured at the junction of resistors R720 and R430, is imposed on reference terminals 257 and 259 and amplifier U3:D1 to disable the COOL RAMP circuit. The ramp circuits will generate a voltage signal as the differences between the return air sensor voltage and the heat sensor voltage or cool sensor voltage pass outside of a dead band of approximately 5° F. The cooling temperature signal output must be below the referenced temperature by about 2.5° F. and the temperature signal from the heat sensor must be above the reference temperature by about 2.5° F. When either condition exists, the ramp voltage signal imposed on terminal 221 will increase starting just outside the deadband.

The operation of the control systems 20 and 200 to vary the speed of a fan motor for a forced air air conditioning system for the advantageous purposes set forth herein is believed to be understandable to those of ordinary skill in the art based on the foregoing description. A correlation table of the components of the systems 20 and 200 is set forth hereinbelow. Certain ones of the circuit components shown in the drawing and included in the correlation table are not discussed in detail but are believed to be understandable to those of ordinary skill in the art. Preferred values and commercial part numbers for certain components are identified also.

CORRELATION TABLE

| ITEM | COMMERCIAL PART NO. | VALUE |
|---|---|---|
| C1 |  | .1 µF |
| C2 |  | 100 µF |
|  |  | 63 V |
| C4 |  | .22 µF |
| C5 |  | .1 µF |
| C6 |  | .1 µF |
| C7 |  | .1 µF |
|  |  | 250 V |
| C8 |  | 0.1 µF |
| C9 |  | .1 µF |
| C10 |  | .1 µF |
| C10A |  | 0.47 µF |
| C11 |  | 10 µF |
|  |  | 25 V |
| C12 |  | 10 µF |
|  |  | 25 V |
| C13 |  | .47 µF |
| C14 |  | .47 µF |
| C20 |  | 0.1 µF |
| C30 |  | 0.1 µF |
| C40 |  | 0.1 µF |
| C50 |  | 100 µF |
|  |  | 63 V |
| C60 |  | 0.1 µF |

CORRELATION TABLE -continued

| ITEM | COMMERCIAL PART NO. | VALUE |
|---|---|---|
| C70 |  | 0.1 µF |
| C80 |  | 0.1 µF |
| C90 |  | 0.47 µF |
| C100 |  | 0.22 µF |
| C110 |  | 0.1 µF |
| C120 |  | .1 µF |
|  |  | 250 V |
| C130 |  | 0.1 µF |
| C140 |  | 0.1 µF |
| C150 |  | 10 µF |
|  |  | 25 V |
| C160 |  | 10 µF |
|  |  | 25 V |
| D1 | IN4148 |  |
| D2 | IN4003 |  |
| D3 | IN4148 |  |
| D4 | IN4148 |  |
| D5 | IN4742A |  |
| D6 | IN4148 |  |
| D7 | IN4148 |  |
| D8 | IN4148 |  |
| D9 | IN4148 |  |
| D10 | IN4148 |  |
| D10A | IN4148 |  |
| D11 | IN4148 |  |
| D12 | IN4148 |  |
| D13 | IN4148 |  |
| D14 | IN4148 |  |
| D15 | IN4148 |  |
| D40 | IN4148 |  |
| D50 | IN4003 |  |
| D60 | IN4148 |  |
| D70 | IN4148 |  |
| D80 | IN4742A |  |
| D90 | IN4148 |  |
| D100 | IN4148 |  |
| D110 | IN4148 |  |
| D120 | IN4148 |  |
| D130 | IN4148 |  |
| D140 | IN4148 |  |
| D150 | IN4148 |  |
| D160 | IN4148 |  |
| D170 | IN4148 |  |
| D180 | IN4148 |  |
| D190 | IN4742A |  |
| D200 | IN4148 |  |
| D210 | IN47742A |  |
| D300 | IN4148 |  |
| Q1 |  | BTA 6 |
| R1 |  | 1M |
| R2 |  | 475K |
| R3 |  | 10K |
| R4 |  | 475K |
| R5 |  | 1M |
| R6 |  | 1M |
| R7 |  | 26.7 K |
| R8 |  | 1M |
| R9 |  | 10K THERMISTOR |
| R10 |  |  |
| R10A |  |  |
| R11 |  | 10K THERMISTOR |
| R11A |  |  |
| R12 |  | 10K |
| R13 |  | 825K |
| R14 |  | 1M |
| R15 |  | 750. ½ W |
| R16 |  | 1M (RP2.4) |
| R17 |  | 1.24K |
| R18 |  | 825K |
| R19 |  | 25.5K |
| R20 |  | 1M |
| R20A |  | 1M |
| R21 |  | 499K |

-continued

CORRELATION TABLE

| ITEM | COMMERCIAL PART NO. | VALUE |
|---|---|---|
| R22 | | 5K |
| R23 | | 634K |
| R23A | | |
| R24 | | 1M |
| R24A | | |
| R25 | | 1M |
| R26 | | 2.74M |
| R27 | | 100K |
| R28 | | 22.1K |
| R29 | | 44.2K |
| R30 | | 470 ½ W |
| R30A | | |
| R31 | | 7.5K |
| R32 | | 510 2 W, METAL OXIDE |
| R32A | | |
| R33 | | 1M |
| R34 | | 1M |
| R35 | | 10K |
| R36 | | 6.04K |
| R37 | | 499 |
| R37A | | |
| R38 | | 10.5K |
| R39 | | 10K |
| R40 | | 200K |
| R41 | | 7.5K |
| R42 | | 100K |
| R43 | | 10K |
| R44 | | 20.5K |
| R45 | | 10K |
| R46 | | 100K |
| R47 | | 1M |
| R48 | | 1M |
| R49 | | 3.48K |
| R50 | | 10K |
| R50A | | 10K |
| R51 | | 2K |
| R70 | | 7.5K |
| R71 | | 100K |
| R80 | | { } |
| R90 | | 200K |
| R100 | | |
| R120 | | 100K |
| R130 | | |
| R140 | | 1M |
| R150 | | 1M |
| R160 | | 10.5K |
| R170 | | 1M |
| R180 | | 10K |
| R190 | | |
| R200 | | 6K 2 W |
| R210 | | 10K |
| R220 | | 1M |
| R250 | | 1M |
| R260 | | 10K |
| R270 | | 3.48K |
| R280 | | |
| R290 | | |
| R300 | | 1M |
| R310 | | 1M |
| R330 | | 2K |
| R340 | | 1M |
| R350 | | 2.74M |
| R360 | | |
| R380 | | |
| R390 | | 1M |
| R400 | | 1M |
| R410 | | 1M |
| R420 | | 100K |
| R430 | | |
| R440 | | 1M |
| R450 | | 10K |
| R460 | | 20.5K |
| R470 | | |
| R480 | | 1M |
| R490 | | 470 ½ W |
| R500 | | |
| R510 | | 10K |
| R520 | | 10K |
| R530 | | 63.4K |
| R540 | | 5K |
| R550 | | |
| R560 | | 1M |
| R570 | | 510 2 W. METAL OXIDE |
| R580 | | 25.5K |
| R590 | | 1M |
| R600 | | 6.04K |
| R610 | | 499 |
| R620 | | |
| R630 | | 22.1K |
| R640 | | 44.2K |
| R650 | | 1M |
| R660 | | |
| R670 | | 1M |
| R680 | | |
| R690 | | 7.5K |
| R700 | | 7.5K |
| R710 | | 100K |
| R720 | | |
| U1:A | LM2902 | |
| U1:A1 | LM2902N | |
| U1:B | LM2902 | |
| U1:B1 | | |
| U1:C | LM2902 | |
| U1:C1 | LM2902N | |
| U1:D | LM2902 | |
| U1:D1 | LM2902 | |
| U2:A | LM2902 | |
| U2:A1 | LM2902 | |
| U2:B | LM2902 | |
| U2:B1 | LM2902 | |
| U2:C | LM2902 | |
| U2:C1 | LM2902 | |
| U2:D | LM2902 | |
| U2:D1 | LM2902 | |
| U3 | MOC3052N | |
| U3:A1 | LM2902 | |
| U3:B1 | LM2902N | |
| U3:C1 | | |
| U3:D1 | LM2902N | |
| U4:A | LM2904 | |
| U4:A1 | LM2904 | |
| U4:B1 | LM2902N | |
| U4:C1 | LM2902N | |
| U4:D1 | LM2902N | |
| U5:A1 | CD4066 | |
| U60 | MOC3052N | |

Although preferred embodiments of the invention have been described in detail herein, those skilled in the art will also recognize that various substitutions and modifications may be made without departing from the scope and spirit of the appended claims.

What is claimed is:

1. A control system for controlling the speed of a fan motor for a forced air conditioning system to vary motor speed during operation of the system to minimize temperature stratification and heating or cooling exchange losses in said air conditioning system, said control system comprising:

a first temperature sensor disposed in a return air flowpath of air returning from an enclosed space to said air conditioning system;

a second temperature sensor located downstream of at least one heat exchanger of said air conditioning system for measuring the air temperature at the location of said second sensor compared with the air temperature at the location of said first sensor;

a ramp circuit for producing a variable voltage output signal dependent on the difference in temperatures sensed by said first and second sensors;

a pulse generator circuit connected to said ramp output circuit and to a power output circuit for controlling the speed of said motor, said pulse generator circuit being operable to vary a pulse signal to said power output circuit as a function of the output signal of said ramp circuit to vary the speed of said fan motor in accordance with the difference in temperatures sensed by said first and second sensors; and a heating operation and cooling operation selection circuit operably connected to an amplifier associated with said power output circuit and an amplifier associated with said ramp circuit.

2. The control system set forth in claim 1 wherein:

said power output circuit includes an opto-isolator and a triac operably connected to said motor and said pulse generator circuit and operable to vary the speed of said fan motor in accordance with a pulse signal generated by said pulse generator circuit.

3. The control system set forth in claim 1 including:

a cutoff circuit operable when a ramp voltage signal decreases to a predetermined value to cause said power output circuit to deenergize said motor.

4. The control system set forth in claim 3 including:

a minimum speed circuit operably connected to said cutoff circuit to cause said power output circuit to operate said motor at a predetermined minimum speed.

5. The control system set forth in claim 4 including:

an adjustable resistor operably disposed in said minimum speed circuit for adjusting the minimum speed of said motor.

6. The control system set forth in claim 5 wherein:

said resistor is operable to adjust the minimum speed of said motor to operate in a range from approximately 180 rpm to 620 rpm.

7. The control system set forth in claim 1 including:

a sensor protection circuit operably connected to said ramp circuit and said power output circuit for causing said power output circuit to operate said motor at full speed when an output signal from said ramp circuit exceeds a predetermined value.

8. The control system set forth in claim 1 including:

a third temperature sensor located downstream of a second heat exchanger of said air conditioning system for measuring the air temperature at the location of said third sensor compared with the air temperature at the location of said first sensor.

9. The control system set forth in claim 8 including:

a circuit operable to receive a signal in response to selection of heat generation by said air conditioning system for causing said motor to run at a minimum speed to provide air circulation at said first sensor and at least one of said second and third sensors.

10. A control system for controlling the speed of a fan motor for a forced air flow air conditioning system operable in a heating mode and a cooling mode and including means forming an air flowpath therein, said control system being operable to vary motor speed during operation of said air conditioning system to minimize temperature stratification in said air flowpath and to minimize heat exchange losses from at least one heat exchanger disposed in said air flowpath, said control system comprising:

a first temperature sensor disposed in a return air part of said air flowpath for measuring the temperature of air returning from an enclosed space to said air conditioning system;

a second temperature sensor located in said air flowpath downstream of said at least one heat exchanger for measuring the air temperature at the location of said second sensor compared with the air temperature at the location of said first sensor;

a ramp circuit for producing a variable voltage output signal dependent on the difference in temperatures sensed by said first and second sensors;

a circuit connected to said ramp circuit and to a power output circuit for varying the speed of said motor as a function of the output signal of said ramp circuit and in accordance with the difference in temperatures sensed by said first and second sensors to minimize temperature stratification in said air flowpath and to minimize heat exchange losses by continuing a progressively changing flow of air across said at least one heat exchanger and through said air flowpath during at least one of startup and shutoff of heat transfer to or from said at least one heat exchanger; and a heating operation and cooling operation selection circuit operably connected to said ramp circuit for controlling the speed of said motor in accordance with operation of said air conditioning system in said heating mode and said cooling mode, respectively.

11. The control system set forth in claim 10 wherein:

said power output circuit includes an opto-isolator and a triac operably connected to said motor and operable to vary the speed of said motor in accordance with a pulse signal.

12. The control system set forth in claim 10 including:

a cutoff circuit operable when a ramp voltage signal decreases to a predetermined value to cause said power output circuit to deenergize said motor.

13. The control system set forth in claim 12 including:

a minimum speed circuit operably connected to said cutoff circuit to cause said power output circuit to operate said motor at a predetermined minimum speed.

14. The control system set forth in claim 10 including:

a sensor protection circuit operably connected to said ramp circuit and said power output circuit for causing said power output circuit to operate said motor at full speed when an output signal from said ramp circuit exceeds a predetermined value.

15. The control system set forth in claim 10 including:

a third temperature sensor located downstream of a second heat exchanger of said air conditioning system for measuring the air temperature at the location of said third sensor compared with the air temperature at the location of said first sensor.

16. The control system set forth in claim 15 including:

a circuit operable to receive a signal in response to selection of heat generation by said air conditioning system for causing said motor to run at a minimum speed to provide air circulation at said first sensor and at least one of said second and third sensors.

* * * * *